(12) United States Patent
Kaneko (10) Patent No.: US 6,195,610 B1
(45) Date of Patent: Feb. 27, 2001

(54) TEACHING METHOD AND APPARATUS OF UNMANNED VEHICLE TRAVELING COURSE

(75) Inventor: Kiyoshi Kaneko, Urawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/117,296

(22) PCT Filed: Jan. 16, 1997

(86) PCT No.: PCT/JP97/00064

§ 371 Date: Jul. 20, 1998

§ 102(e) Date: Jul. 20, 1998

(87) PCT Pub. No.: WO97/26590

PCT Pub. Date: Jul. 24, 1997

(30) Foreign Application Priority Data

Jan. 18, 1996 (JP) ...................................... 8-024590

(51) Int. Cl.$^7$ ............................ G01C 21/00; G05D 1/02; E02F 9/20
(52) U.S. Cl. ................................. 701/200; 701/1; 701/25; 701/26; 701/41; 701/50; 701/70; 701/206; 701/207; 701/210; 701/217; 701/221; 701/301; 434/305
(58) Field of Search ................................. 701/1, 22, 23, 701/25, 26, 41, 50, 70, 116, 200, 201, 202, 206, 207, 208, 210, 217, 220, 221, 223, 300, 301; 434/118, 305, 373

(56) References Cited

FOREIGN PATENT DOCUMENTS

| | | |
|---|---|---|
| 5-297942 | 11/1993 | (JP) . |
| 8-101712 | 4/1996 | (JP) . |

*Primary Examiner*—Robert A. Hafer
*Assistant Examiner*—John Edmund Rovnak
(74) *Attorney, Agent, or Firm*—Sidney & Austin (57) ABSTRACT

A teaching method includes dividing an automatic traveling course (96) into a plurality of zones before teaching, conducting teaching for each zone of a plurality of zones at the time of teaching so as to generate position coordinate data for each zone as course data for each zone, and combining course data for respective zones and store the same after teaching. An apparatus includes a teaching zone designating function section (41) for designating a zone inside an automatic traveling course (96) divided into a plurality of zones, a position coordinate data function section (42) of an unmanned vehicle (3), zone-specific traveling course data memory means (43), a teaching course data writing function section (44) for writing the position coordinate, a teaching data edit instruction function section (45) for outputting an instruction after the completion of teaching route, and a total traveling course data edit function section (46) for combining and editing the traveling course data. Thereby the change of teaching of the course can be made within a short time.

15 Claims, 10 Drawing Sheets

TEACHING METHOD AND APPARATUS OF UNMANNED VEHICLE TRAVELING COURSE

This is a national Stage Application under 35USC371 of International Application PCT/JP97/00064, filed Jan. 16, 1997.

TECHNICAL FIELD

The present invention relates to an unmanned vehicle, and particularly to a teaching method and an apparatus for an unmanned vehicle which travels along a course.

BACKGROUND ART

Conventionally, an unmanned dump truck driving system is known as a system for transporting earth and sand by a dump truck for use, for instance in a quarrying site or the like of a large area. An example of an unmanned dump truck driving system is as described below. Teaching the traveling course to the unmanned dump truck is conducted by a specified method, and the coordinate data on the traveling course at each predetermined distance and each predetermined time are stored in a storage unit. At the time of automatic traveling, the unmanned dump truck confirms the current position where the dump truck is actually traveling at each predetermined sampling time, and computes the deviation between the actual position and the aforementioned traveling course data previously stored. Then, in order to reduce the deviation, the traveling control of steering, vehicle speed, start and halt of the unmanned dump truck is conducted, and the unmanned dump truck is controlled so as to run along the traveling course previously stored.

Figure 26:
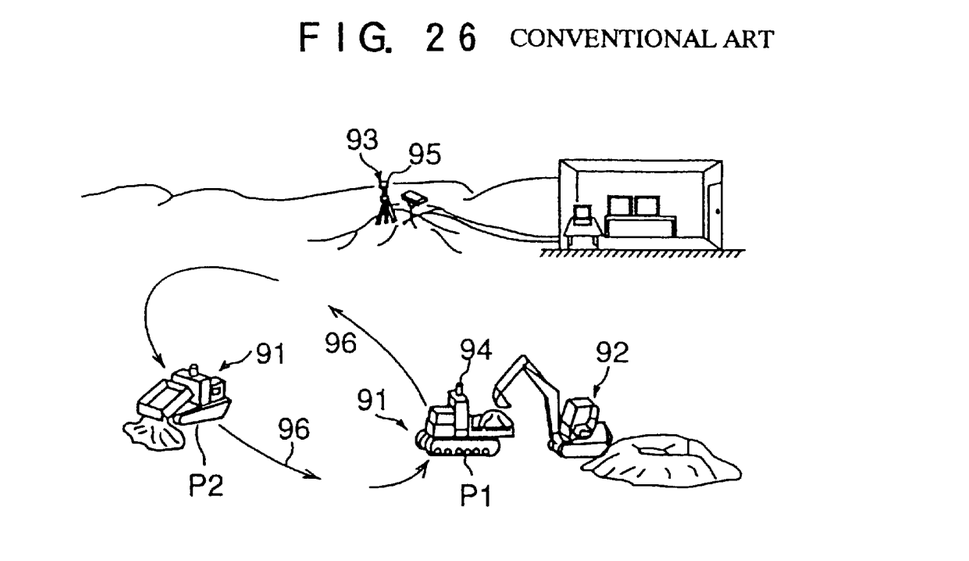
FIG. 26 is an explanatory diagram of an automatic traveling system of an unmanned crawler dump truck in accordance with the conventional art.

For example, Japanese Laid Open Patent Application No. 5-297942 discloses an unmanned dump truck driving system provided with an unmanned crawler dump truck, a loader, and a fixed station as shown in FIG. 26. Explaining the system based on FIG. 26, an unmanned crawler dump truck 91 and a fixed station 93 are respectively provided with bidirectional automatic tracking devices 94 and 95. The bidirectional automatic tracking devices 94 and 95 are automatically controlled by a control circuit section (not shown) so as to always receive light waves, which are sent to each other, on the front thereof. Thereby the distance and the direction of the unmanned crawler dump truck 91, with the fixed station 93 being set as a reference position, can be measured. Based on the measured results, a control device, not illustrated, in the fixed station 93 computes the current position of the unmanned crawler dump truck 91 as coordinate data in the driving system. The computed current position data are transmitted to the unmanned crawler dump truck 91 side by the medium of a data transmitter (not illustrated). Further, a loading position P1 at which the loader 92 loads the unmanned crawler dump truck 91 with earth and sand, or the like, and an unloading position P2 at which earth and sand, or the like loaded is discharged are provided in the driving system.

An automatic traveling course 96 for the unmanned crawler dump truck 91 to reciprocate between the loading position P1 and the unloading position P2 is obtained by teaching. The course data of the automatic traveling course 96 for which teaching is conducted are stored in the storage unit (not illustrated) of the unmanned crawler dump truck 91. When the unmanned crawler dump truck 91 conducts automatic traveling, the control device of the unmanned crawler dump truck 91 gives instructions to traveling control means (not illustrated) to control the steering, vehicle speed, start, and halt so as to reduce the deviation between the current position of the unmanned crawler dump truck 91 which is traveling and the course data in the aforementioned storage unit. In this way, the unmanned crawler dump truck 91 conducts automatic traveling along the automatic traveling course 96 between the loading position P1 and the unloading position P2, for which teaching has been conducted.

The teaching of the automatic traveling course 96 is conducted as described in the below. The operator of the dump truck gets into the driver's seat, and at first moves the crawler dump truck 91 to the loading position P1 to set the loading position P1 as a starting point. Thereafter, the automatic tracking devices 94 and 95 of the unmanned crawler dump truck 91 and the fixed station 93, are actuated, and each of them is automatically controlled so as to always receive the light waves, which both of the automatic tracking devices 94 and 95 send to each other, on the front thereof. The fixed station 93 computes the coordinate data of the current position of the unmanned crawler dump truck 91 at this time, and the current position data is transmitted to the unmanned crawler dump truck 91 side and stored in the storage unit.

Next, the operator operates the unmanned crawler dump truck 91 at a predetermined vehicle speed (for example, about 5 km/h) along the desired automatic traveling course 96. At this time, the control device of the unmanned crawler dump truck 91 conducts sampling at each predetermined interval (for example, 50 cm, or less) of the automatic traveling course 96, and the traveling coordinate data at each sampling point are stored in the storage unit in the unmanned crawler dump truck 91. The coordinate data is also stored at the unloading position P2 similarly to the above, and further the automatic traveling course 96 from the unloading position P2 up to the loading position P1 is also stored. After the teaching is completed, the unmanned crawler dump truck 91 conducts automatic traveling based on the course data in the storage unit.

However, in the aforementioned conventional teaching method, when a traveling course is changed, teaching has to be conducted again by operating the entire traveling course once again. For example, the change of the loading position P1 or the like is frequently required, therefore the change of the teaching has to be frequently conducted. In addition, strict positioning and vehicle attitude are required at the loading position P1 and the unloading position P2, therefore it is necessary to redo teaching many times under certain circumstances. Even in this case, teaching has to be redone by conducting teaching operation of the entire traveling course. Therefore, a great deal of time is spent on the change. In addition, the other dump trucks cannot operate while the change of teaching is made. Therefore, it is necessary to temporarily stop the operation of the unmanned vehicle driving system, thereby causing a disadvantage of reducing the availability of the unmanned vehicle driving system.

When conducting teaching of a simple reciprocating traveling course as in the aforementioned conventional method, the halt position at the time of conducting the teaching route is consistently considered as an earth discharging position, and earth can be discharged at this halt position at the time of automatic operation. However, when a plurality of dump trucks 3 run on the same automatic traveling course 96, standby is conducted to prevent interference with and collision against one another, or switching of moving forward [from/to] and/or reversing is conducted before the loading position P1 and the unloading position P2. Therefore, the traveling course becomes complicated. For this reason, it is necessary to conduct teaching of the functions (whether standby, switching moving forward [from/to] and/or reversing, discharging earth, and the like) at these halt positions in correspondence to the traveling course.

SUMMARY OF THE INVENTION

The present invention is made to eliminate the disadvantages of the aforementioned conventional art, and its object is to provide a teaching method and an apparatus of an unmanned vehicle traveling course by which the change of teaching of a traveling course can be made in a short time, teaching can be conducted easily without disturbing the other operating unmanned vehicles, and the operation items of the unmanned vehicle on the traveling course can be set with ease.

A teaching method of an unmanned vehicle traveling course according to the present invention is a teaching method of an unmanned vehicle traveling course including the steps of conducting teaching operation of an unmanned vehicle with human assistance along an automatic traveling course at the time of teaching, memorizing the course data of the aforementioned automatic traveling course, and conducting unmanned operation of the aforementioned unmanned vehicle along the aforementioned automatic traveling course based on the aforementioned memorized course data at the time of automatic traveling, and is characterized by including the steps of dividing the aforementioned automatic traveling course into a plurality of zones before the aforementioned teaching, generating position coordinate data for each zone as course data for each zone, while conducting teaching operation for each zone of the plurality of zones at the time of the teaching, and combining and storing the course data for each zone as course data of the automatic traveling course before conducting the automatic operation.

According to the aforementioned structure, the automatic traveling course is previously divided into a predetermined plurality of zones, and on conducting teaching of a traveling course, the teaching operation is conducted for each zone to generate traveling course data. After completing the teaching for all of the zones, the traveling course data for the respective zones are combined and edited as the traveling course data of the entire course to generate the target operating course. As a result, when changing the traveling course, it is not necessary to conduct teaching of the entire traveling course once again, but it is only necessary to conduct teaching for the zone to be changed. Thus, the change of teaching can be easily made in a short time. In addition, even when other unmanned vehicles and the like are operating on the automatic traveling course, the change of teaching can be made while there are no other vehicles in the zone to be changed. Therefore, other operating vehicles are not disturbed. As a result, it is not necessary to temporarily stop the operation of the unmanned vehicle operating system in order to change the teaching, therefore system availability can be increased.

Further, in the method of the aforementioned structure, upon changing the course data which is generated by combining the course data of the respective zones and stored, a zone for conducting new teaching may be selected from the plurality of zones, the start of traveling may be inputted before the start of teaching operation at the time of teaching of the selected zone, teaching operation may be conducted after the input, and the arrival at the final point of the selected zone may be inputted to generate the course data for the selected zone. On arriving at the final point in at least one of the aforementioned plurality of zones, or on inputting the arrival, an operation item to be conducted by the unmanned vehicle at a final point may be inputted and set.

According to the aforementioned structure, when teaching is conducted for each zone, a zone for conducting teaching can be arbitrarily selected. Before actually starting teaching operation for the zone selected, the start of travel is inputted (for example, by switch input), and when arriving at the final point of this zone after traveling, the arrival is inputted (for example, by switch input). Thereby, operation items (for example, standby, switch to moving forward/reversing, discharge of earth, and the like) at each of the final points (each of the halting positions) can be set with ease. Therefore, at the time of teaching traveling, a correct operation item can be set corresponding to a zone selected.

The present invention includes a teaching apparatus of an unmanned vehicle traveling course for conducting teaching operation of an unmanned vehicle with human assistance along an automatic traveling course at the time of teaching, for memorizing the course data of the automatic traveling course, and for conducting unmanned traveling of the unmanned vehicle along the automatic traveling course based on the memorized course data at the time of automatic operation, and is characterized by including a teaching zone designation function section for designating at least one zone for conducting teaching traveling in the aforementioned automatic traveling course previously divided into a plurality of zones, a position coordinate data computing function section for computing the position coordinate data of the aforementioned unmanned vehicle in teaching operation at each predetermined time or at each predetermined distance, zone-specific traveling course data memory means for memorizing traveling course data for each of the designated zones in teaching operation, a teaching course data writing function section for writing the computed position coordinate data to the zone-specific traveling course data memory means on conducting teaching operation of the unmanned vehicle in the designated zone, a teaching data edit instruction function section for outputting an instruction to starting editing the traveling course data after completing the teaching operation in the zones including the designated zone, and a total traveling course data edit function section for combining and editing the memorized traveling course data for each designated zone, as traveling course data of the automatic traveling course when inputting the edit starting instruction.

According to the aforementioned structure, when a driver conducts a teaching operation of the vehicle in the traveling zone designated by the teaching zone designation function section, the position coordinate data of the vehicle is computed by the position coordinate data computing function section. The teaching course data writing function section sequentially writes the computed position coordinate data to the zone-specific traveling course data memory means in correspondence to the zone for which the teaching is conducted. When the edit instruction is inputted after the teaching operation for all of the zones is completed, the total traveling course data edit function section combines and edits the course data for the respective zones stored in the course-specific traveling course data memory means as the data of a traveling course, and generates the entire traveling course (automatic traveling course) data.

When changing the teaching of part of the traveling course, a zone to be changed is designated by means of the teaching zone designating function section, and thereafter a teaching operation is conducted for the zone to be changed. Then the traveling course data corresponding to the zone is sequentially written to the zone-specific traveling course data memory means as described in the above. When the change of teaching is completed and the edit instruction is inputted, the total traveling course data edit function section combines the course data of the zone, for which the change of teaching is newly made, and which is stored in the zone-specific traveling course data memory means, with the course data of the other zones for which teaching was previously conducted. By this combination, the above course data is edited as the data of a traveling course. As a result, the operational effects of the aforementioned method of the invention are obtained.

DETAILED DESCRIPTION OF THE INVENTION

A preferred embodiment of the present invention will be particularly described with reference to the attached drawings.

Figure 1:
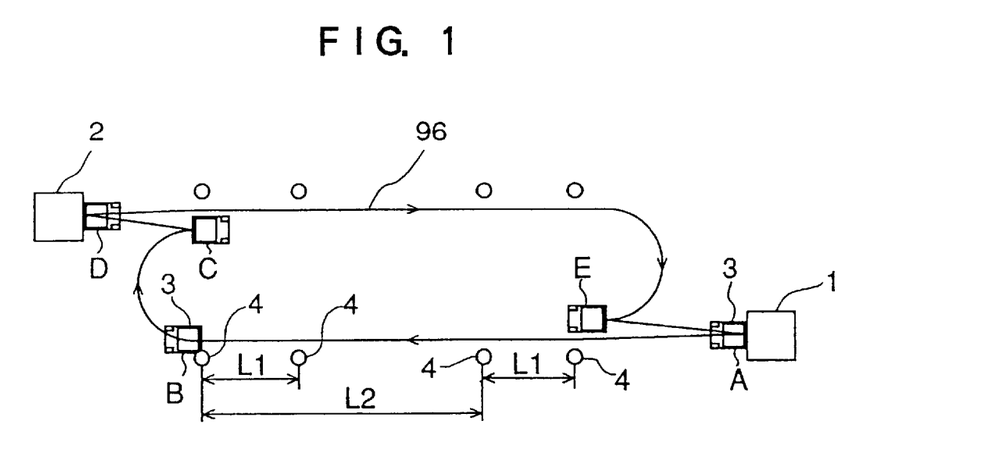
FIG. 1 is an explanatory diagram of an example of a divided automatic traveling course in a teaching method in accordance with the present invention.

FIG. 1 is an example of an automatic traveling course 96 explaining the present embodiment. In the automatic traveling course 96, provided are a loading site 2 where an unmanned dump truck 3 is loaded with earth and sand, or the like in a rear deck thereof, and an earth discharging site (also referred to as a vertical shaft) 1. Here, a halt position of the dump truck 3 at the earth discharging site 1 is called an earth discharging position A, and a halt position at the loading site 2 is called a loading position D. A standby point at the time of entering the loading position D is called a face entrance B, a turnabout position at the time of entering the loading position D is called a turnabout point C, and a standby point at the time of entering the earth discharging site 1 is called a vertical shaft entrance E. In the present invention, the automatic traveling course 96 is divided into a predetermined number of zones, and teaching of the course is conducted individually for each zone. For example, FIG. 1 shows an example course divided into five zones, from the earth discharging position A to the face entrance B, from the face entrance B to the turnabout point C, from the turnabout point C to the loading position D, from the loading position D to the vertical shaft entrance E, and from the vertical shaft entrance E to the earth discharging position A.

At predetermined positions of the automatic traveling course 96, a pair of position correcting poles 4 (hereinafter, referred to as correcting poles 4) for correcting the current position and traveling direction of the dump truck 3 while traveling are placed with a predetermined interval L1 between them. Respective pairs of correcting poles 4 are spaced at least at a specified interval L2. The correcting poles 4 are placed at predetermined positions of which coordinate data is already known in the absolute coordinate systems set in the automatic traveling course 96. Incidentally, in this embodiment, the correcting poles 4 are placed at positions at a predetermined interval to the left of the automatic traveling course 96 relative to the traveling direction of the dump truck 3, but they may be placed to the right of the automatic traveling course 96.

Figure 2:
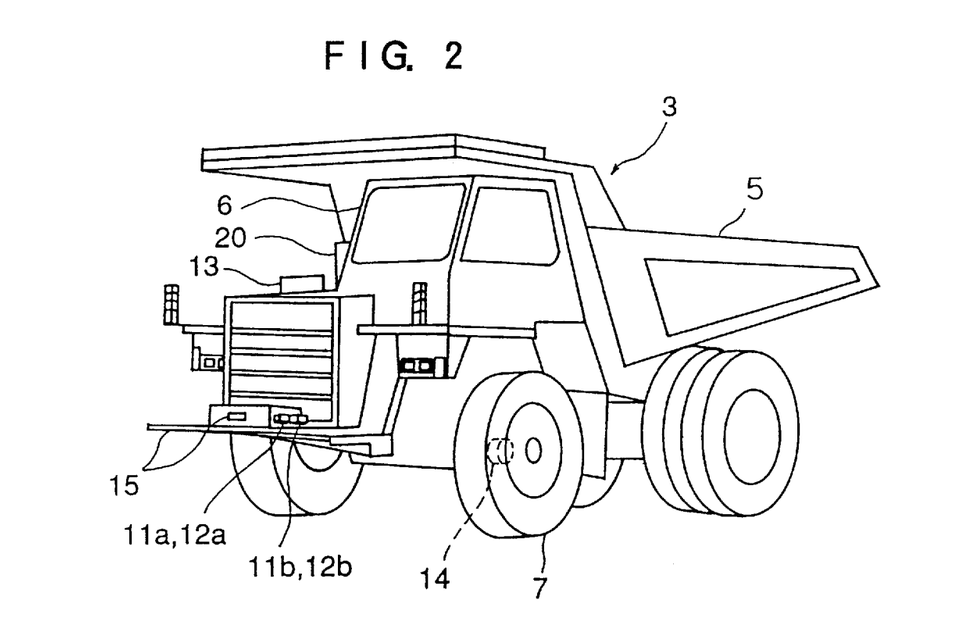
FIG. 2 is a perspective view of an unmanned traveling dump truck in accordance with the present invention.

In FIG. 2, the dump truck 3 has a rear deck 5 at the rear portion on the traveling vehicle body, and a driver's cabin 6 at the front portion thereon. A pair of position correcting laser beam emitting devices 11*a* and 11*b* (hereinafter referred to as beam emitting devices 11*a* AND 11*b*) and a pair of position correcting laser beam receiving devices 12*a* and 12*b* (hereinafter, referred to as beam receiving devices 12*a* and 12*b*) are placed at the front end portion of the vehicle body in order to correct the current position. Each of the beam emitting and beam receiving directions of a pair of the beam emitting device 11*a* and the beam receiving device 12*a* are set at 60 degrees to the left the traveling direction of the dump truck 3. Each of the beam emitting and beam receiving directions of the other pair of the beam emitting device 11*b* and the beam receiving device 12*b* are set at 90 degrees to the left relative to the same direction.

An optical fiber gyro 13 for detecting the traveling direction is provided at the front portion of the vehicle body, and a distance traveled detector 14 for detecting the rotational frequency of a wheel 7 is provided at the rotational shaft of the wheel 7. An obstacle sensor 15 for detecting obstacles in the front and the rear in the traveling direction is provided at the front and rear end portions of the vehicle body. The obstacle sensor 15 is composed of a noncontacting obstacle detector using, for example, a laser radar and ultrasonic wave, and a contacting type of obstacle detector for detecting an obstacle by actuating a limit switch, or the like, when a lever or the like provided at the front end portion hits against an obstacle and is thereby pressed.

The correcting pole 4 has a reflector plate (not illustrated) for reflecting laser beams, and position correcting laser beams emitted from the beam emitting devices 11*a* and 11*b* are reflected on the reflector plate and received by the beam receiving devices 12*a* and 12*b*. Incidentally, the reflecting direction of the aforementioned reflector plate is set at 60 degrees and 90 degrees to the left relative to the traveling direction of the dump truck 3. As described above in the present embodiment, the correcting poles 4 are placed on the left side relative to the traveling direction of the dump truck 3, therefore the beam emitting devices 11*a* and 11*b*, and the beam receiving devices 12*a* and 12*b*, are mounted facing to the left. However, the above positions are not restrictive, and it may be suitable if only the correcting poles 4, and the beam emitting devices 11*a* and 11*b* and the beam receiving devices 12*a* and 12*b* are facing each other, therefore the correcting poles 4 may be placed to the right of the automatic traveling course 96.

Figure 3:
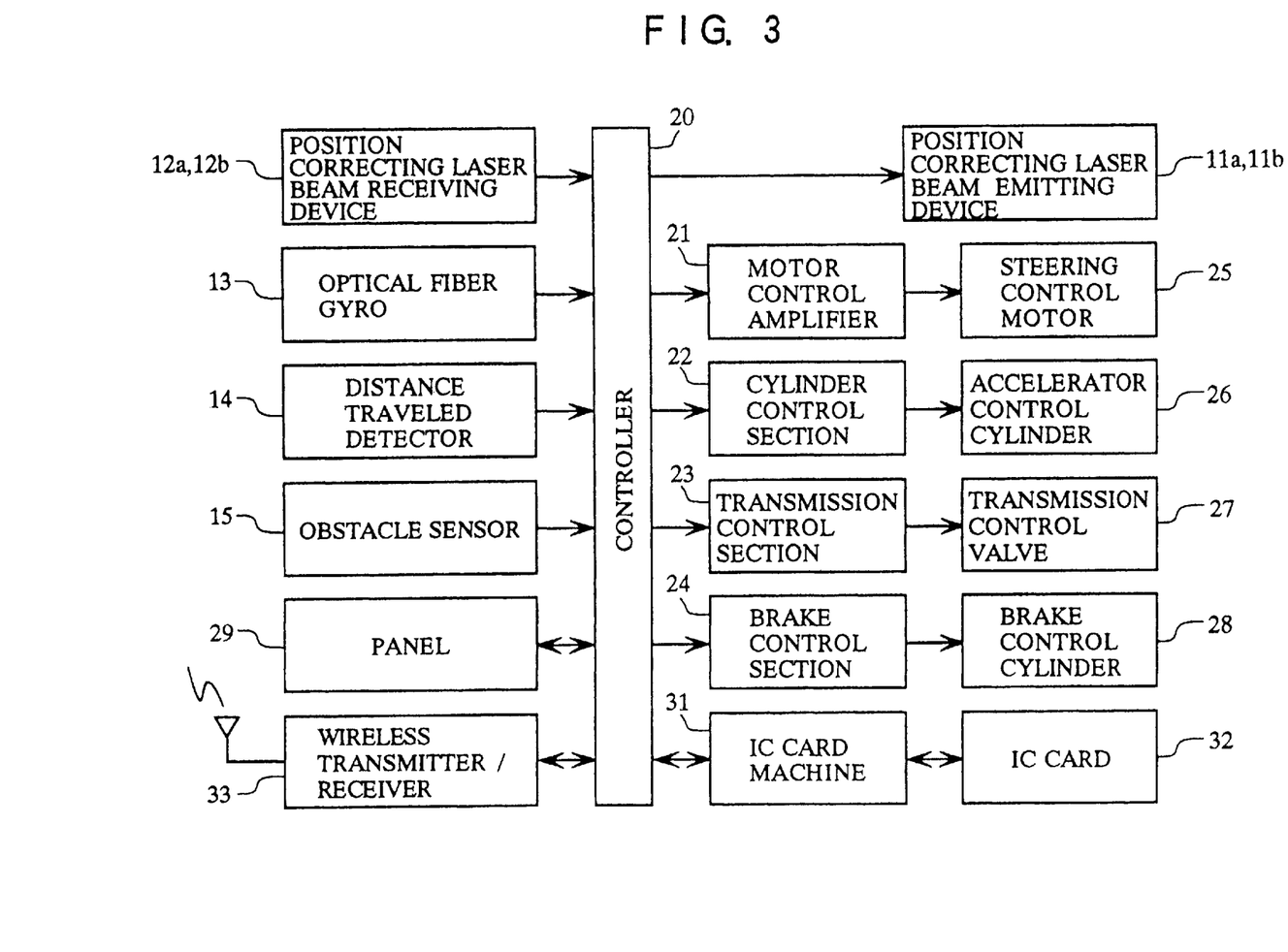
FIG. 3 is a block diagram of automatic traveling control of the dump truck in accordance with the present invention.

FIG. 3 is an example of automatic operation by so-called dead reckoning, but the present invention is not limited to this example. A controller 20 controls the automatic operation of the dump truck 3 as a whole, and is composed of an ordinary computer system composed of, for example, a microcomputer as a main body. The optical gyro 13 detects angular speed when the dump truck 3 changes directions, and the controller 20 integrates the angular speed and computes the current traveling direction of the dump truck 3. The distance traveled detector 14 detects the rotational frequency of the wheel 7, and the controller 20 computes the distance traveled by the dump truck 3 based on the rotational frequency and the distance traveled per rotation of the wheel 7. The distance traveled detector 14 is composed of, for example, a pulse generator, or the like, which outputs pulses numerically proportional to the rotational frequency per unit hour. The controller 20 computes rotational frequency by counting the number of pulses per unit time. The controller 20 computes the current position at each time based on the traveling direction during operation and the distance traveled as described above with a staring point set as a reference position, and controls a traveling course, conducting automatic traveling by so-called dead reckoning.

There are detecting errors in the distance traveled obtained by the distance traveled detector 14, and in the traveling direction obtained by the optical gyro 13. Therefore, when operating by dead reckoning is continued, the current position computed deviates from the actual position. In order to correct the deviation, the position correcting beam emitting devices 11*a* and 11*b*, and the beam receiving devices 12*a* and 12*b* are provided. The beam emitting devices 11*a* and 11*b* emit laser beams in a cycle of a predetermined hour just like a pulse, and the laser beams are reflected on the aforementioned reflector plates of the correcting poles 4 and one received by the beam receiving devices 12*a* and 12*b*. At this time, the controller 20 determines the distance traveled from a beam receiving point by the beam receiving device 12*a* up to a beam receiving point by the beam receiving device 12*b* by a signal based on the distance traveled detector 14. The controller 20 computes the distance between the dump truck 3 and the correcting pole 4 at the beam receiving point by the beam receiving device 12*b* based on the aforementioned distance traveled, and further computes the current position and the traveling direction of the dump truck 3 based on the aforementioned distance computed. Based on the computed results, the current position at the time of dead reckoning, and the traveling direction obtained by the optical fiber gyro 13 are corrected to increase the detecting precision of the current position of the dump truck 3.

The obstacle sensor 15 detects whether an obstacle exists within a predetermined distance, and when an obstacle exists, an obstacle detecting signal is outputted to the controller 20. A non-contacting type sensor detects an obstacle in less than a predetermined distance from the dump truck 3, while a contacting type sensor detects an obstacle just before the dump truck 3.

A motor control amplifier 21 controls a steering control motor 25 to control a steering angle, and carries out control so as to reduce the deviation between steering angle instruction data from the controller 20 and steering angle current value data from a steering angle detector (not illustrated) thereby controlling the traveling direction of the dump truck 3. A cylinder control section 22 controls an accelerator control cylinder 26 and then controls the amount of acceleration of an engine. The accelerator control cylinder 26 controls, for example, the time of operating an accelerator pedal (not illustrated). The cylinder control section 22 carries out control so as to reduce the deviation between the accelerator instruction data from the controller 20 and the operating time data from an accelerator pedal operating time detector (not illustrated).

A transmission control portion 23 carries out switching of moving forward/reversing, traveling gears and the like by controlling a transmission control valve 27, and controls the automatic transmission based on the transmission control instruction inputted from the controller 20. Further, a brake control portion 24 controls a brake control cylinder 28 and carries out braking and braking release of the wheel 7. The brake control portion 24 carries out braking and braking release based on the brake control instruction inputted from the controller 20.

A panel 29 is connected to the controller 20. The panel 29 allows the selection of each of the traveling modes (for example, manual operation, automatic operation, teaching operation, and position reset operation) of the dump truck 3, and each kind of setting in a teaching operation mode. The explanation of the present embodiment below shows an example of the panel 29 composed of a graphic display and transparent touch keys attached on the surface of the display, and each setting, mode switching, and the like can be carried out by manipulating the transparent touch keys while watching a switch display, message display, or the like shown on the graphic display. The graphic display is composed of, for example, a liquid crystal display, a plasma display, and CRT display. Data transmission and reception between the panel 29 and the controller 20 is carried out by serial communications or the like such as, for example, RS232C, or data communications or the like by parallel I/O.

An IC card machine 31 is connected to the controller 20, and the IC card machine 31 reads and writes data from an to an IC card 32 based on the instruction from the controller 20. The course data of the traveling course for which teaching is conducted is stored in the IC card 32. Further a wireless transmitter-receiver 33 is connected to the controller 20. The wireless transmitter-receiver 33 carries out wireless communications with an outside monitoring station (not illustrated), and receives course number data for automatic operation, control instruction, and the like from the monitoring station. The controller 20 reads course data corresponding to the course number data into the internal memory from the IC card 32, and controls starting, halting, and the like of the dump truck 3 correspondingly to the control instruction based on the received course number data, control instruction, and the like.

Figure 4:
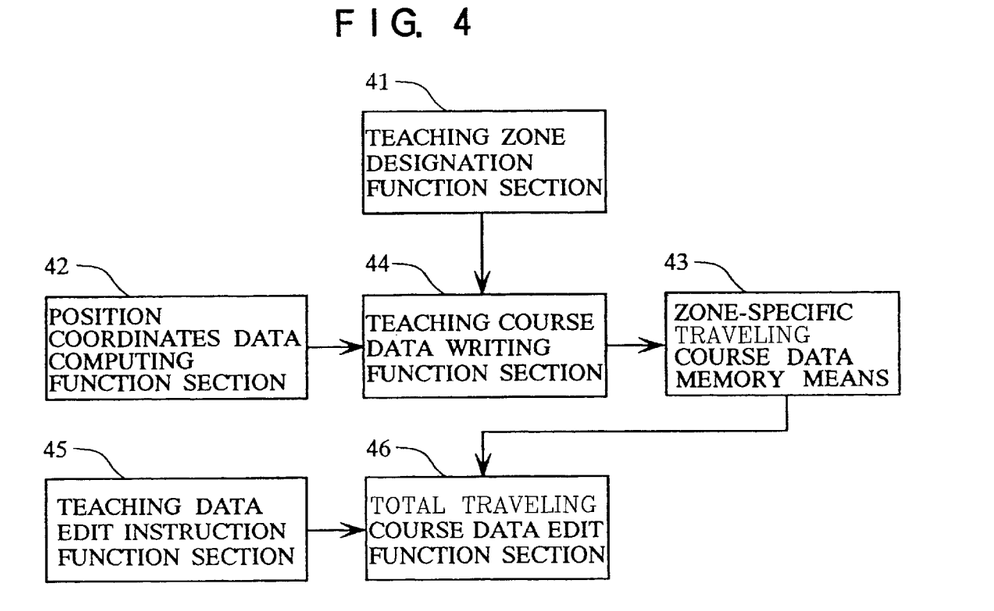
FIG. 4 is a block diagram of functions of a teaching apparatus in accordance with the present invention.

The dump truck 3 according to the aforementioned structure will be explained next based on FIG. 4. A teaching zone designating function section 41 designates a course zone out of the predetermined zones into which the traveling course is divided as described above, and is defined by graphic display and touch key input on the panel 29. A position coordinate data computing function section 42 computes position coordinate data at each predetermined time, or at each predetermined traveling distance of the dump truck 3 during teaching. For example, in dead reckoning according to the present embodiment, relative position coordinate data of the dump truck 3 from the reference position is obtained based on the distance traveled obtained from the distance traveled detector 14, and the traveling direction obtained from the optical fiber gyro 13. Incidentally, when detecting the position coordinates of the dump truck 3 by using a GPS system or the like, the absolute coordinate position in a global scale is computed based on a reception signal from a satellite, thereby obtaining the aforementioned position coordinate data of the dump truck 3.

A zone-specific traveling course data memory means 43 (hereinafter referred to as a course memory means 43) memorizes traveling course data corresponding to each of the zones. A teaching course data writing function section 44 (hereinafter referred to as a writing function section 44) takes in the position coordinate data of the dump truck 3 in the teaching operation from the position coordinate data computing function section 42, and writes the same to the course memory means 43 corresponding to the teaching zone designated by the teaching zone designating function section 41. A teaching data edit instruction function section 45 outputs a starting command for editing the course data of all of the zones into the data of one course after teaching of all zones has been completed, and is defined by graphic display and touch key input on the panel 29. Further, a total traveling course data editing function section 46 edits course data of each zone stored in the course memory means 43 into the data of one course on receiving the edit starting command from the teaching data edit instruction function section 45.

Figure 5:
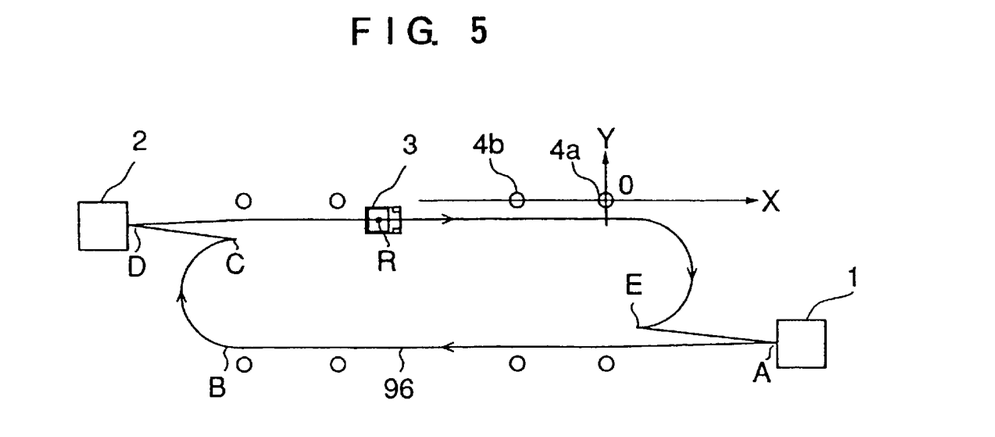
FIG. 5 is an explanatory diagram of position reset operation in accordance with the present invention.

Next, the procedures of teaching will be explained. In dead reckoning, it is necessary to find out the position on the absolute coordinates of the automatic traveling course 96 corresponding to the current position of the dump truck 3 for teaching before teaching is started. For this purpose, a position reset operation is conducted before the teaching operation is conducted. An operator switches an automatic/manual changeover switch (not illustrated) provided at the side of the driver's seat, for example, in the driver's cabin 6 of the dump truck 3 to establish the manual mode. Incidentally, a mode switching signal of this automatic/manual conduct position reset traveling, the operator places the dump truck 3 at a position reset traveling starting point R as shown in FIG. 5. The position reset traveling starting point R is set at a position more than a predetermined distance short of the correcting pole 4b pairing with the correcting pole 4a at the final point short of the vertical shaft entrance E. Here, it is assumed that the point of origin ○ on the absolute coordinates of the automatic traveling course 96 is the position of the correcting pole 4a, and also assumed that the direction of the line connecting the correcting pole 4a and the correcting pole 4b is the direction of X axis and that the direction perpendicular thereto is the direction of Y axis.

Figure 6:
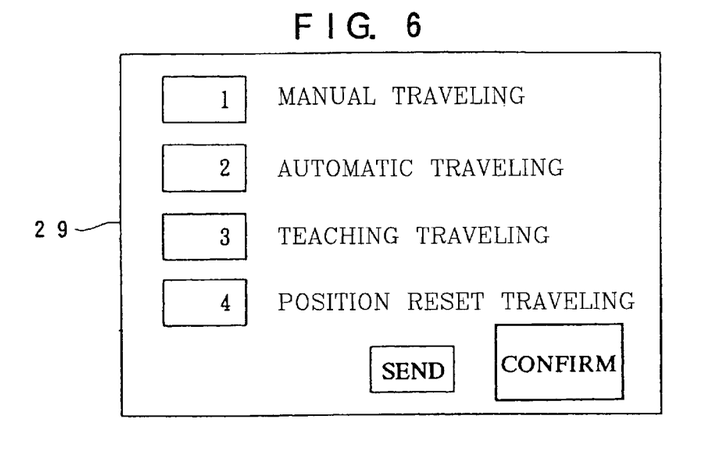
FIG. 6 is an explanatory diagram of a mode selection screen of a panel in a teaching method in accordance with the present invention.
Figure 7:
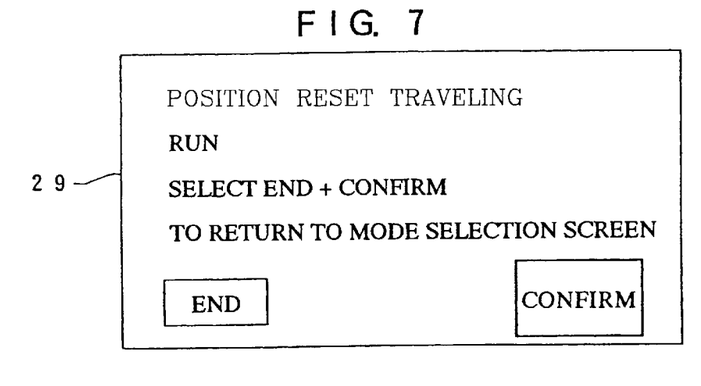
FIG. 7 is an explanatory diagram of a panel screen at the time of position reset operation in accordance with the present invention.

At the position reset traveling starting point R, in a mode selection screen of the panel 29 as shown in FIG. 6, the operator touches (inputs) "4", and "CONFIRM" sequentially in order to switch to the position reset traveling mode. As a result, the screen on the panel 29 turns into one shown in FIG. 7, and then the operator drives the dump truck 3 forward from the position reset traveling starting point R parallel to the direction of the X axis at a predetermined vehicle speed (for example, 10 km/h). At the time when the dump truck 3 has passed by the correcting poles 4b and 4a, the current position of the dump truck 3 with the correcting pole 4a as a reference can be determined, therefore the controller 20 stores the current position in a specified memory area as absolute coordinates position data from the point of origin ○. Similarly, the extent of the inclination of the traveling direction of the dump truck 3, at the time when the dump truck 3 runs from the side of the correcting pole 4b toward the side of the correcting pole 4a, relative to the X axis direction can be computed, therefore the controller 20 stores the traveling direction at this time in a specified memory area as the data of absolute traveling direction relative to the X axis direction. In this way, the current position data and the traveling direction data in the controller 20 are assigned on the absolute coordinates.

The operator stops the dump truck 3 after driving it forward up to the vertical shaft entrance E. After further reversing the dump truck 3 up to the earth discharging position A at a predetermined vehicle speed (for example, 5 km/h), the operator stops the dump truck 3. Next, in a screen in FIG. 7, when touching "END", and "CONFIRM" in this order, the screen on the panel 29 returns to the mode selection screen in FIG. 6, and the position reset traveling is finished.

Next, the procedures of conducting teaching of the automatic traveling course 96 in the teaching operation mode will be explained. In the present embodiment, the dump truck 3 is driven along a desired traveling course, and a method for memorizing the coordinate data of the traveling course at this time as teaching data is shown.

Figure 8:
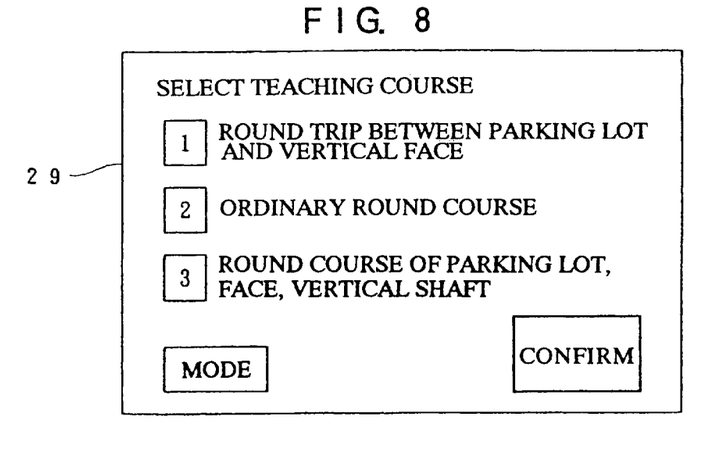
FIG. 8 is an explanatory diagram of a course selection screen in a teaching mode in accordance with the present invention.
Figure 9:
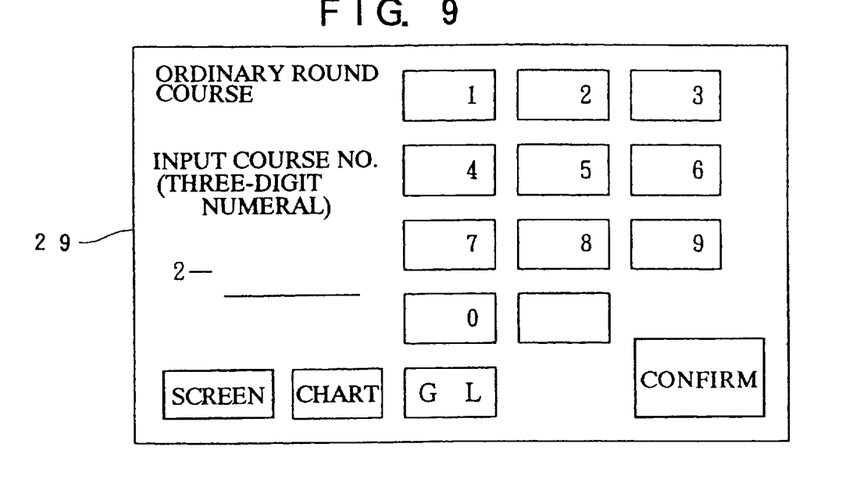
FIG. 9 is an explanatory diagram of a course setting screen in the teaching mode in accordance with the present invention.

As illustrated on the screen shown in FIG. 6, when an operator touches "CONFIRM" after touching "3" in order to select the teaching traveling mode, the screen on the panel 29 is switched to that as in FIG. 8. In this screen, teaching of three kinds of traveling courses are available. Here, a case of teaching of an ordinary round course is explained, therefore "CONFIRM" is touched after "2" (ordinary round course) is touched. Thereby turning the screen into a course setting screen as shown in FIG. 9. A three digit course number is affixed to each of the traveling courses for which teaching is conducted, and based on this course number, course data is controlled. In the screen in FIG. 9, when the operator inputs the aforementioned course number by touching numeric keypad display from 0 to 9 in the screen, and touches "CONFIRM", input is completed and the screen switches to that as in FIG. 10.

Figure 10:
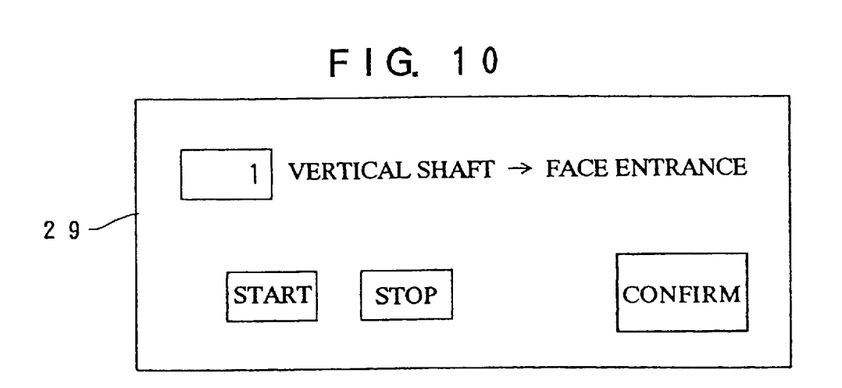
FIG. 10 is an explanatory diagram of a zone confirming screen in the teaching mode in accordance with the present invention.
Figure 11:
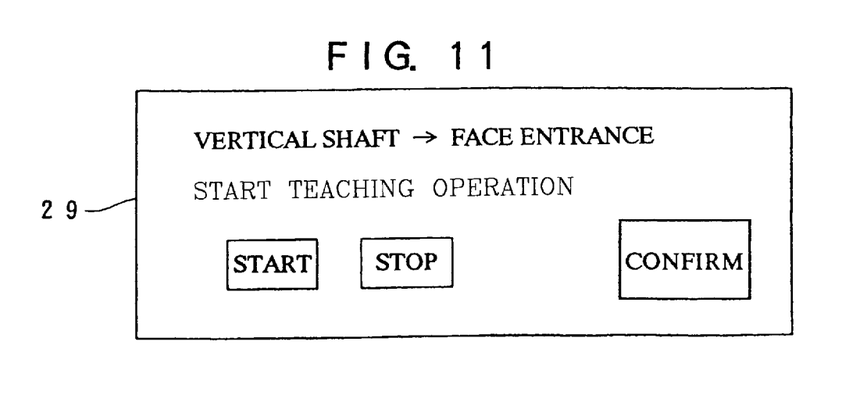
FIG. 11 is an explanatory diagram of a zone teaching start confirming screen in the teaching mode in accordance with the present invention.

The screens in FIGS. 10 and 11 express the teaching zone designating function section 41, and show that the teaching to be conducted from now is for the course from the vertical shaft (earth discharging position A) to the face entrance B. In the screen in FIG. 10, when the operator confirms the display message, and thereafter touches "1", "START", and "CONFIRM" in this order, the screen is switched to that as in FIG. 11. Further, on touching "CONFIRM" after touching "START" following the display message, the screen is switched to that as in FIG. 12, and teaching is started. Here, the teaching zone designating function section 41 is set to show the teaching zones on the screen in order, and to let an operator conduct confirmation and teaching operation following the information on the screen, but the method is not restrictive. For example, it is suitable to show all of the teaching zones on one screen, from which one is selected, or to directly input a zone name, zone number, or the like.

Figure 12:
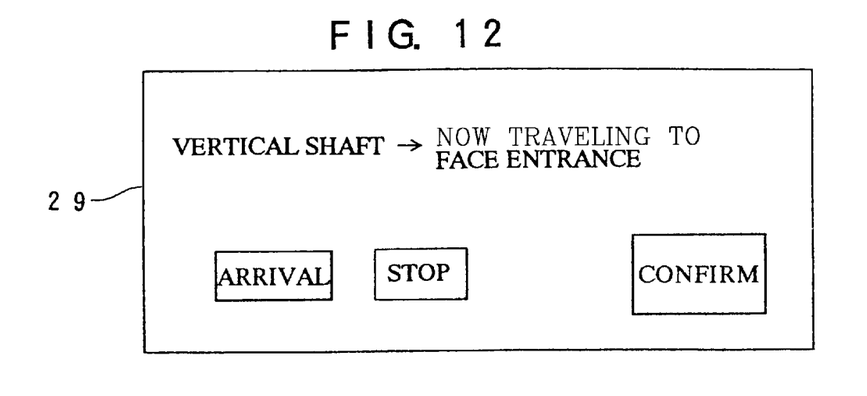
FIG. 12 is an explanatory diagram of a zone teaching end confirming screen in the teaching mode in accordance with the present invention.

When the operator drives the dump truck 3 forward from the earth discharging position A to the vertical face entrance B along a desired traveling course in the condition as in FIG. 12, the controller 20 computes the position coordinate data on the traveling course at each predetermined time with the position coordinate data computing function section 42. Following the above, the controller 20 writes the position coordinate data to a specified memory area of the course memory means 43 with the writing function section 44.

The details of the aforementioned computation and writing will be explained next. In the position coordinate data computing function section 42, a traveling direction is detected by integrating the angular speed signal from the optical fiber gyro 13, and a distance traveled is computed based on the signal from the distance traveled detector 14. Based on the starting position data, the aforementioned traveling direction, and the distance traveled after a predetermined time (for example, 0.1 seconds), the coordinate data of the current position is computed. This coordinate data is outputted to the writing function section 44. The writing function section 44 writes the aforementioned coordinate data in a specified memory area of the course memory means 43 corresponding to the zone designated by the teaching zone designating function section 41. Next, similar to the above, the coordinate data of the current position after a predetermined time are computed with the above memorized position being set as a reference, and the computed result is written to the aforementioned specified memory area. By repeating these steps, the coordinate data for each predetermined time on the actual traveling course of the dump truck 3 is memorized in the course memory means 43 in order. The operator halts the dump truck 3 at the face entrance B, and thereafter on touching "ARRIVAL", and "CONFIRM" in this order, the screen on the panel 13 turns into that as in FIG. 13. Thereby finishing teaching of the zone from the earth discharging position A to the face entrance B.

Figure 14:
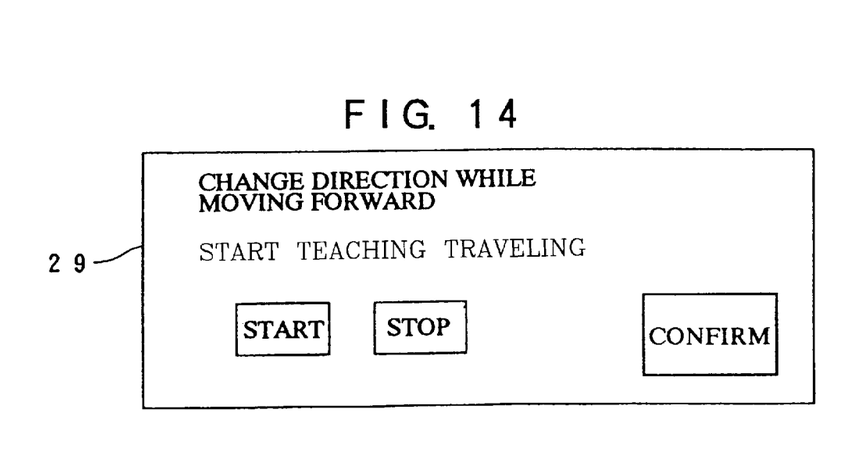
FIG. 14 is an explanatory diagram of the zone teaching start confirming screen in the teaching mode in accordance with the present invention.
Figure 15:
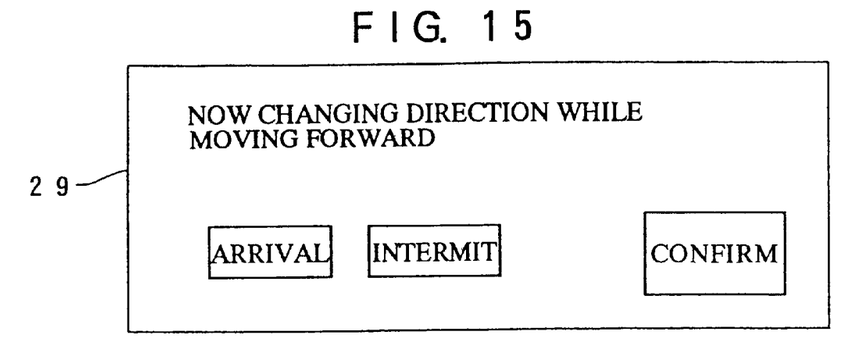
FIG. 15 is an explanatory diagram of the zone teaching end confirming screen in the teaching mode in accordance with the present invention.

Next, one of the other zones is designated with the teaching zone designating function section 41. Here, teaching of the zone from the face entrance B to the turnabout point C is conducted. The turnabout point C is a point at which the dump truck 3 changes direction from moving forward to reversing, therefore in the screen in FIG. 13, "3" (turnabout while moving forward), "START", and "CONFIRM" are touched in this order. Thereafter, the screen is switched to that as in FIG. 14, and when the operator confirms the messages displayed, and touches "START", and "CONFIRM" in this order, the screen is switched to that as in FIG. 15. Then the operator drives the dump truck 3 forward from the face entrance B to the turnabout point C at a specified vehicle speed. Similarly to the above, when forward driving is conducted, the controller 20 computes the position coordinate data on the traveling course at each predetermined time with the position coordinate data computing function section 42, and writes the position coordinate data to a specified memory area of the course memory means 43 in order with the writing function section 44. When the dump truck 3 arrives at the turnabout point C, the operator halts the dump truck 3, and thereafter touches "ARRIVAL", and "CONFIRM" on the panel 29 in this order. Thereby the screen on the panel 29 is switched to that as in FIG. 13, and teaching of the zone from the face entrance B to the turnabout point C is finished.

Figure 16:
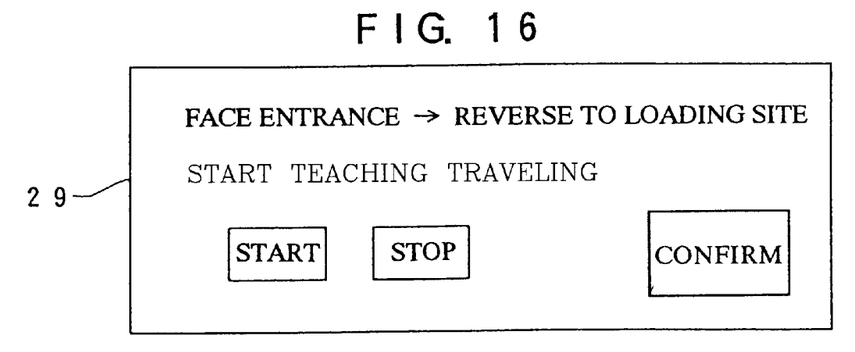
FIG. 16 is an explanatory diagram of the zone teaching start confirming screen in the teaching mode in accordance with the present invention.
Figure 17:
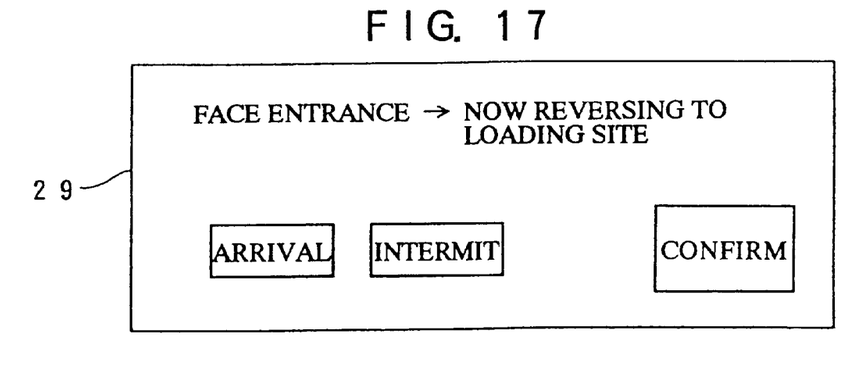
FIG. 17 is an explanatory diagram of the zone teaching end confirming screen in the teaching mode in accordance with the present invention.

Next, similar to the above, the teaching zone from the turnabout point C to the loading position D is designated with the teaching zone designating function section 4. Here, the dump truck 3 reverses up to the loading position D, therefore the operator touches "2" (reverse from the face entrance to the loading site), "START", and "CONFIRM" in this order on the screen in FIG. 13. Thereby switching the screen to that as in FIG. 16, and the operator confirm the message displayed. By touching "START", then "CONFIRM", the screen is switched to that as in FIG. 17. Here, when the operator reverses the dump truck 3 from the turnabout point C to the loading position D at a predetermined vehicle speed, the controller 20 computes the position coordinate data on the travel course at each predetermined time with the position coordinate data computing function section 42 similar to the above. The position coordinate data computed is written to a specified memory area of the course memory means 43 in order by the writing function section 44. When the dump truck 3 arrives at the loading site D, the operator halts the dump truck 3, and thereafter touches "ARRIVAL", and "CONFIRM" on the panel 29 in this order. Thereby switching the screen in the panel 29 to that as in FIG. 18, and finishing the teaching of the zone from the turnabout point C to the loading position D.

Figure 18:
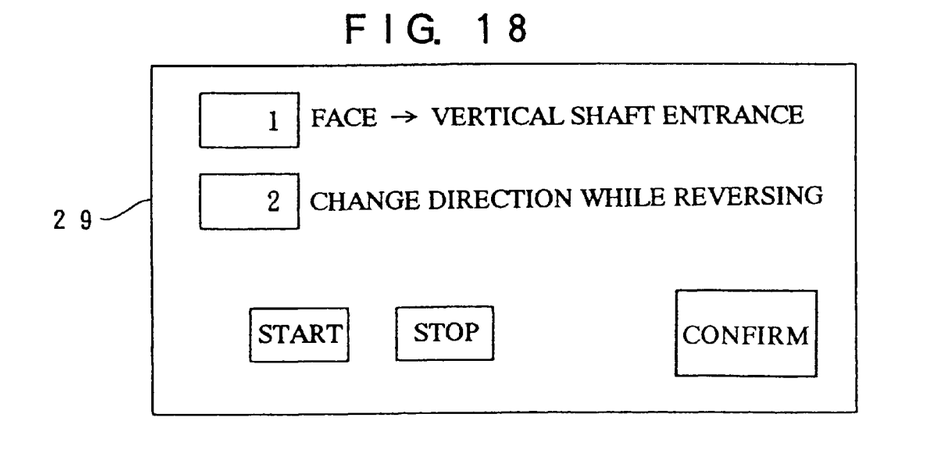
FIG. 18 is an explanatory diagram of the zone confirming screen in the teaching mode in accordance with the present invention.

Next, the teaching zone from the loading position D (face) to the vertical shaft entrance E is designated, and the operator touches "1" (from the face to the vertical entrance), "START", and "CONFIRM" in this order on the screen in FIG. 18. Thereby the screen is switched to that as in FIG. 19. When the operator confirms the message displayed, and touches "START", then "CONFIRM", the screen is switched to tat as in FIG. 20. Here, when the operator drives the dump truck 3 from the loading position D to the vertical shaft entrance E at a predetermined vehicle speed, the controller 20 computes the position coordinate data on the traveling course at each predetermined time with the position coordinate data computing function section 42 similarly to the above, and the writes the position coordinate data to a specified area of the course memory means 43 in order with the writing function section 44. When the dump truck 3 arrives at the vertical shaft entrance E, the operator halts the dump truck 3, and thereafter touches "ARRIVAL", and "CONFIRM" on the panel 29 in this order. Thereby the screen on the panel 29 is switched to that as in FIG. 21, and the teaching of the zone from the loading position D (face) to the vertical entrance E is finished.

Figure 21:
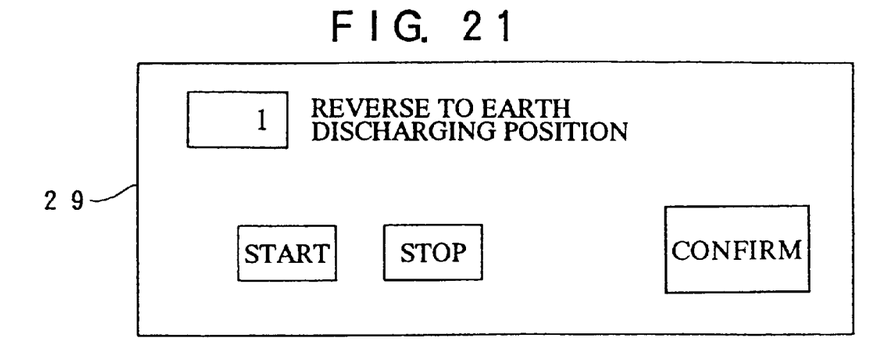
FIG. 21 is an explanatory diagram of the zone confirming screen in the teaching mode in accordance with the present invention.
Figure 22:
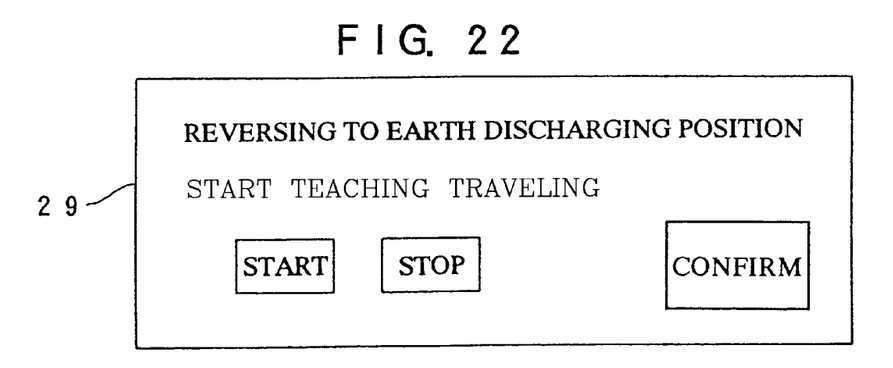
FIG. 22 is an explanatory diagram of the zone teaching start confirming screen in the teaching mode in accordance with the present invention.
Figure 23:
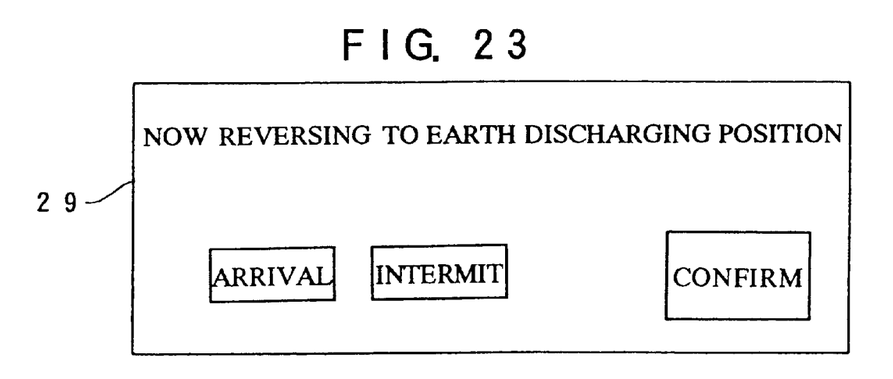
FIG. 23 is an explanatory view of the zone teaching end confirming screen in the teaching mode in accordance with the present invention.

Next, the teaching zone from the vertical entrance E to the earth discharging position A is designated, therefore the operator touches "1" (reverse to the earth discharging position), "START", and "CONFIRM" on the screen in FIG. 21 in this order. Thereby the screen is switch to that as in FIG. 22, and when the operator confirms the message displayed, and touches "START", then "CONFIRM", the screen is switched to that as in FIG. 23. Here, when the operator reverses the dump truck 3 from the vertical shaft entrance E to the earth discharging position A at a predetermined vehicle speed, the controller 20 computes the position coordinate data on the traveling course at each predetermined time with the position coordinate data computing function section 42, and writes the position coordinate data to a specified area of the course memory means 43 with the position coordinate data writing function section 44. When the dump truck 3 arrives at the earth discharging position A, the operator halts the dump truck 3, and thereafter touches "ARRIVAL", and "CONFIRM" in this order. Thereby, the screen on the panel 29 is switched to that as in FIG. 24, and the teaching of the zone from the vertical shaft entrance E to the earth discharging position A is finished.

Figure 24:
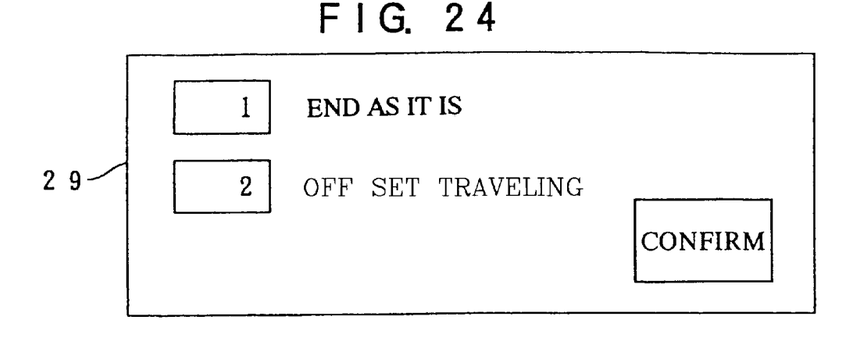
FIG. 24 is an explanatory diagram of a screen for confirming the end of the entire teaching in the teaching mode in accordance with the present invention.
Figure 25:
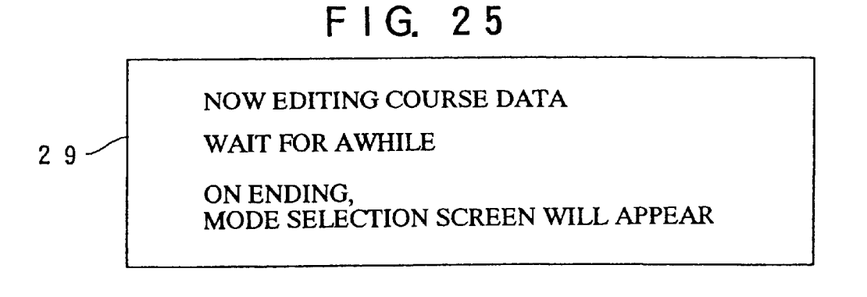
FIG. 25 is an explanatory diagram of a screen showing that course data is now being edited at the end of the entire teaching in the teaching mode in accordance with the present invention.

The screen in FIG. 24 shows the teaching data edit instruction function section 45, which gives instruction to start editing the teaching data according to the zones. At this point, teaching of all zones is completed, and when the operator touches "1" (end as it is), and "CONFIRM" sequentially, the teaching data edit instruction function section 45 outputs edit starting instruction to the total traveling course data edit function section 46, and the screen is switched to that as in FIG. 25.

Thereafter, the controller 20 performs processing of uniting and editing the data of five courses, which are individually taught and stored in the course memory means 43, as the data of the automatic traveling course 96 by means of the total traveling course data edit function section 46. The course data edited is stored in a specified memory area in the IC card 32 corresponding to the aforementioned set course numbers (see FIG. 9). When the edit is completed, the screen is switched to the mode selection screen in FIG. 1, which means that the teaching of a traveling course is completed.

If one of the zones of the course already taught is desired to be changed, the following steps are taken. Here, assume that the position reset traveling is completed, a case of changing the teaching will be explained, by selecting the course, for example, from the loading position D (face) to the vertical entrance E. When "TEACHING TRAVELING" is selected on the mode selection screen in FIG. 6 similar to the above, the screen turns to that as shown in FIG. 8. On selecting "ORDINARY ROUND COURSE" in FIG. 8, the screen turns into that as shown in FIG. 9. When an operator inputs the course number desired to change and touches "CONFIRM", the corresponding course data already taught are read from the IC card 32 to a specified memory area. Thereafter, the screen turns into that as in FIG. 10.

Figure 13:
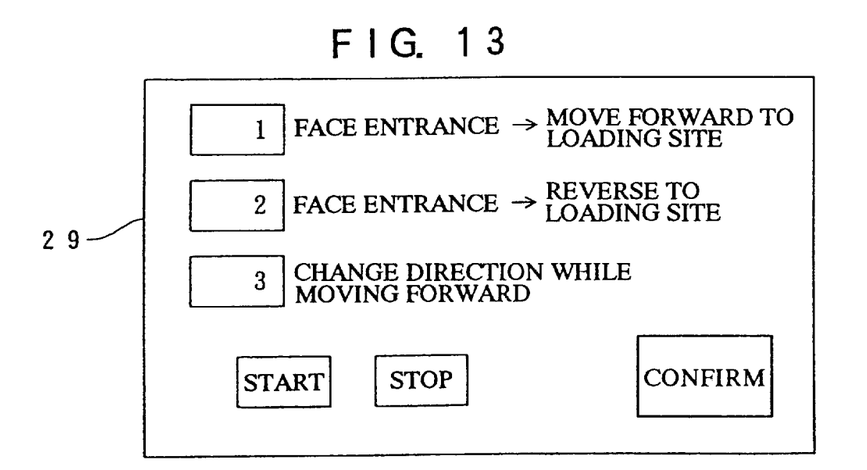
FIG. 13 is an explanatory diagram of the zone confirming screen in the teaching mode in accordance with the present invention.
Figure 19:
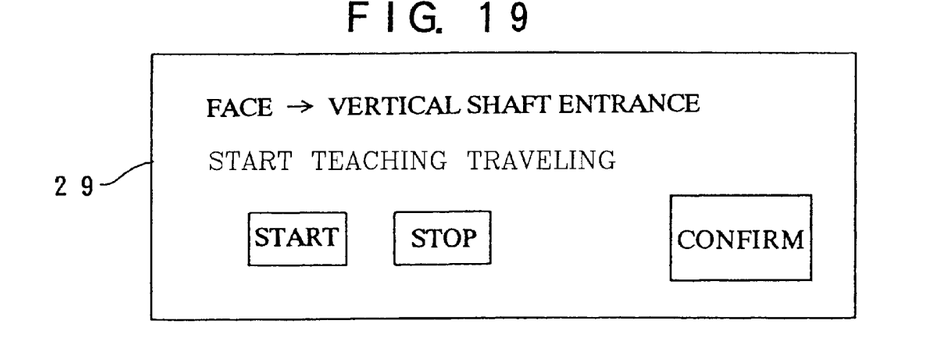
FIG. 19 is an explanatory diagram of the zone teaching start confirming screen in the teaching mode in accordance with the present invention.
Figure 20:
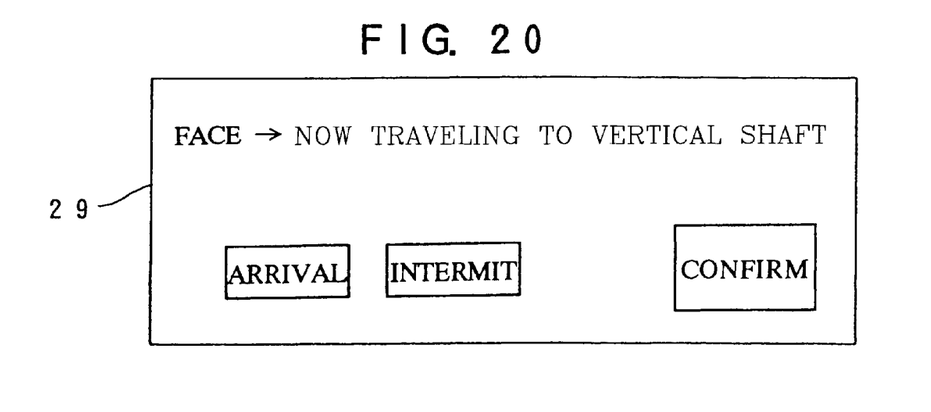
FIG. 20 is an explanatory diagram of the zone teaching end confirming screen in the teaching mode in accordance with the present invention.

Next, in order to designate the teaching zone from the loading position D (face) to the vertical shaft entrance E, it is necessary to switch the screen to that as in FIG. 18, and an example of switching is as follows. On touching "STOP" on the screen in FIG. 10, the screen turns into that as shown in FIG. 13, and here when further touching "STOP", the screen is switched to that as shown in FIG. 18. Here, as shown in the above, the operator switches the screen to those as shown in FIGS. 19 and 20 in this order, and designates a teaching zone, Switching to the screens in FIGS. 19 and 20 is carried out before the dump truck 3 starts traveling. With the screen in FIG. 20, the dump truck 3 is driven along a desired course from the loading position D (face) to the vertical shaft entrance E. At this time, the controller 20 computes the position coordinate data on the traveling course, which is newly taught, at each predetermined time by means of the position coordinate data computing function section 42. The controller 20 writes the computed position coordinate data to a specified memory area of the course memory means 43 corresponding to the zone from the loading position D (face) to the vertical shaft entrance E by means of the writing function section 44 in orderly sequence. On arriving at the final point of the designated teaching zone, and on finishing the teaching traveling, "ARRIVAL" is touched (inputted) on the screen in FIG. 20. Then, by touching "CONFIRM", the screen turns into that as in FIG. 21, and by further touching "STOP", the screen turns to that as in FIG. 24. By touching "1" and "CONFIRM" in this order, the edit starting instruction is outputted from the teaching data edit instruction function section 45, and the total traveling course data edit function section 46 starts editing the total course data. At this time, the newly taught course data is used for editing as course data corresponding to the zone from the loading position D (face) to the vertical entrance E. As a result, teaching of the course data with only one of the zones in the traveling course being changed can be easily made in a short time.

Automatic operation based on the course data which is taught as in the above is conducted as described below. First, an operator selects "1" (manual traveling) on the mode selection screen of the panel 29 in FIG. 6, and drives the dump truck 3 to the earth discharging position A of the vertical shaft, and halts it in a predetermined orientation. Then by switching the aforementioned automatic/manual changeover switch (not illustrated) of the dump truck 3 to establish the automatic mode. On the mode selection screen of the panel 29 in FIG. 6, "2" (automatic traveling) is selected. The controller 20 inputs an automatic mode signal of the aforementioned automatic/manual changeover switch, and inputs the selection of the automatic traveling on the mode selection screen, thereby enabling the automatic operation of the dump truck 3. In this state, the dump truck 3 waits for the control instruction from the monitor station.

When the course number data for the dump truck 3 to run is sent from the monitor station side over the air, the controller 20 inputs the course number data by means of the wireless transmitter receiver 33, and reads the course data corresponding to the number from the IC card 32, and writes it to a specified memory. Further, on receiving the automatic traveling starting instruction from the monitor station by means of the wireless transmitterreceiver 33, the controller 20 starts automatic traveling control following the course data in the aforementioned specified memory. Specifically, the controller 20 controls the steering control motor by means of the cylinder control section 22 in order to head for the first target position in the course data from the present position, thereby controlling the steering angle, The controller 20 controls the amount of acceleration by controlling the accelerator control cylinder by means of the cylinder control section 22 in order to run at a predetermined vehicle speed, and at the same time, controls the traveling gears by controlling the transmission control valve 27 by means of transmission control section 23. In this way, when the dump truck 3 travels up to the target position at a predetermined vehicle speed, the traveling direction is computed based on the next target position data in the course data, and the automatic traveling is controlled up to the next target position following this direction, Similarly to the above, by repeating the aforementioned controls, the dump truck 3 can conduct automatic traveling based on the course data. When halting the dump truck 3, the controller 20 controls the accelerator control cylinder to reduce the amount of acceleration to zero, and controls the brake control cylinder 28 by means of brake control section 24 to brake the dump truck 3 to a halt.

Errors in the current position and the traveling direction in the automatic traveling by dead reckoning are corrected by traveling between the pair of correction poles 4 as described below. Specifically, the controller 20 computes the traveled distance from the position of the dump truck 3 when the nearer one of the pair of the correction poles 4 is at 60 degrees to the left relative to the traveling direction of the dump truck 3 up to the position of the dump truck 3 when the correcting poles 4 is at 90 degrees to the left by means of the beam emitting devices 11a and 11b, the beam receiving devices 12a and 12b, and the distance traveled detector 14. Based on the computed results, the controller 20 obtains the distance between the dump truck 3 and the correcting pole 4 at the time when the correcting pole 4 is at 90 degrees to the left of the dump truck 3. It is assumed that the actual current position and traveling direction at this position match to the current position and the traveling direction which are computed by dead reckoning. When the dump truck 3 further travels automatically by dead reckoning, and passes by the other one of the aforementioned pair of correcting poles 4, the controller 20 obtains the distance between the dump truck 3 and the correcting pole 4 at the time when the correcting pole 4 is at 90 degrees to the left of the dump truck 3 as in the above. From the relationship expression of three of the actual current position and traveling direction at this position, the current position and the traveling direction which are computed by dead reckoning, and the actual current position and traveling direction which are obtained in the vicinity of the aforementioned nearer correcting pole 4, the current position and the traveling direction at the second correcting pole 4 are computed. Thereby the current position and the traveling direction which are computed by dead reckoning are corrected, and automatic traveling by dead reckoning is conducted thereafter in the same way as in the above.

As explained thus far, the automatic traveling course 96 is divided into a plurality of zones, and teaching is conducted for every zone, and when the change of teaching is required for a certain course, it can be made by conducting teaching of the course only in the zone in need of change, therefore the change of teaching can be made within a short time. Even when the other unmanned vehicles are traveling on the automatic traveling course 96, teaching can be easily conducted only in a zone requiring the change without disturbing the other operating vehicles, therefore teaching can be made without reducing the system availability.

Further, when setting the positions in the automatic traveling course 96 at which the following operations such as standby, switch of moving forward/reversing, loading, earth discharging are carried out, these setting can be easily made by designating the teaching zone by menu-selection. Specifically, a zone in which any one of the aforementioned operation items such as standby and so on is carried out at the final point is selected from the plurality of divided zones and can be set by inputting on the menu selection screen. Incidentally, an operation item such as standby or the like can be set at the starting point of the teaching in the following zone instead of the final point in a predetermined zone. Thereby enabling to set an operation item corresponding to a traveling course without an error. In addition, it is not necessary to set these operation items after finishing the teaching of all the zones, therefore automatic traveling is immediately carried out on the course for which teaching is already conducted. As a result, efficiency of teaching operation is enhanced.

INDUSTRIAL AVAILABILITY

The present invention is useful as a teaching method and apparatus of an unmanned vehicle traveling a course, by which the change of teaching of the course can be made within a short time, teaching can be made without disturbing the other unmanned vehicles operating, and the operation items on the traveling course of an unmanned vehicle can be easily set.

I claim:

1. A method of teaching a traveling course to an unmanned vehicle for automatic operation comprising the steps of:

dividing a traveling course to be taught into a plurality of zones, each zone comprising a portion of said traveling course;

operating the vehicle with human assistance along a portion of the traveling course corresponding to one of said plurality of zones to generate course position data corresponding to said zone;

storing said generated course position data;

repeating said operating and storing steps to generate course position data for each of said plurality of zones; and combining said stored course position data for each of said zones to obtain course position data for said traveling course.

2. A method of teaching a traveling course to an unmanned vehicle in accordance with claim 1, further comprising the step of:

automatically operating said unmanned vehicle along said traveling course based on said stored course position data for said traveling course.

3. A method of teaching a traveling course to an unmanned vehicle in accordance with claim 1, further comprising the steps of:

selecting a zone to be updated from said plurality of zones;

operating the vehicle with human assistance along a portion of the traveling course corresponding to said zone to be updated to generate updated course position data; and combining said updated course position data with said stored course position data to generate course position data for said traveling course which includes updated course position data for said zone to be updated.

4. A method of teaching a traveling course to an unmanned vehicle in accordance with claim 3, further comprising the steps of:

selecting a teaching start mode prior to the step of operating the vehicle with human assistance along said portion of the course corresponding to said zone to be updated; and selecting a teaching end mode after said step of operating the vehicle with human assistance along said portion of the course corresponding to said zone to be updated.

5. A method of teaching a traveling course to an unmanned vehicle in accordance with claim 1, further comprising the step of:

inputting a operation item to be conducted by said unmanned vehicle;

wherein a portion of the traveling course corresponding to at least one of said plurality of zones includes a final point, and wherein said operation item to be conducted by said unmanned vehicle is inputted at said final point and is stored with said course position data.

6. A method of teaching a traveling course to an unmanned vehicle in accordance with claim 1, wherein a portion of the traveling course corresponding to each of said plurality of zones includes a predetermined starting point and a predetermined final point, and wherein said combining step combines said generated course position data for said teaching zone with said course position data corresponding to other ones of said plurality of zones based on said starting and final points.

7. An apparatus for teaching a traveling course to an unmanned vehicle comprising:

a memory device for memorizing course data corresponding to a traveling course to be taught as said unmanned vehicle is operated with human assistance for teaching, said traveling course being divided into a plurality of zones, each zone of said plurality of zones comprising a portion of said traveling course;

an input device for inputting operator commands including a command to designate a teaching zone, said teaching zone being one of said plurality of zones;

a vehicle operating device for operating the vehicle with human assistance along a portion of the traveling course corresponding to said teaching zone to generate course position data corresponding to said teaching zone; and a combining device for combining said generated course position data corresponding to said teaching zone with course position data corresponding to other ones of said plurality of zones memorized in said memory device.

8. An apparatus for teaching a traveling course to an unmanned vehicle in accordance with claim 7, further comprising:

means for conducting unmanned operation of said unmanned vehicle along said traveling course based on memorized course data.

9. An apparatus for teaching a traveling course to an unmanned vehicle in accordance with claim 7, wherein a portion of the traveling course corresponding to at least one of said plurality of zones includes a final point, and wherein said input device for inputting operator commands includes a command to designate a operation item to be conducted by said unmanned vehicle which is inputted at said final point and is stored with said course position data.

10. An apparatus for teaching a traveling course to an unmanned vehicle in accordance with claim 7, wherein a portion of the traveling course corresponding to each of said plurality of zones includes a starting point and a final point, and wherein said combining device combines said generated course position data for said teaching zone with said course position data corresponding to other ones of said plurality of zones based on said starting and final points.

11. An apparatus for teaching a traveling course to an unmanned vehicle in accordance with claim 7, further comprising:

a processing device for computing position coordinates corresponding to said course data during said teaching.

12. A apparatus for teaching a traveling course to an unmanned vehicle comprising:

a direction change detector;

a distance traveled detector;

a controller responsive to said direction change detector and said distance traveled detector for controlling the operation of said unmanned vehicle in an automatic mode based on a traveling course stored in a memory, said traveling course being divided into a plurality of zones, each zone comprising a portion of said traveling course;

a steering control device responsive to said controller for controlling steering of said vehicle;

an accelerator control device responsive to said controller for controlling acceleration of said vehicle;

a brake control device responsive to said controller for controlling braking of said vehicle;

a panel for selecting modes;

manual steering, accelerator, and brake controls for operating the vehicle with human assistance in a teaching mode, said teaching mode for generating course position data corresponding to one zone of said plurality of zones by operating the vehicle with human assistance along a portion of the traveling course corresponding to said zone;

a combining device for combining said generated course position data corresponding to said zone with course position data in said memory to obtain course position data for said traveling course.

13. A apparatus for teaching a traveling course to an unmanned vehicle in accordance with claim 12, further comprising:

a position correcting device, responsive to said direction change detector, said distance traveled detector and a position reference device for correcting a position of a vehicle.

14. A apparatus for teaching a traveling course to an unmanned vehicle in accordance with claim 12, wherein said panel includes a graphics display and input keys.

15. A apparatus for teaching a traveling course to an unmanned vehicle in accordance with claim 12, wherein a portion of the traveling course corresponding to at least one of said plurality of zones includes a final point, and wherein said panel may be used to select a mode to designate a operation item to be conducted by said unmanned vehicle which is inputted at said final point and is stored with said course position data.

* * * * *